US012701362B2

(12) United States Patent
Lee et al.

(10) Patent No.: US 12,701,362 B2
(45) Date of Patent: Aug. 4, 2026

(54) SYSTEM AND METHOD FOR PROVIDING SOUND IN A HEADSET

(71) Applicant: Lenovo (Singapore) Pte Ltd, Singapore (SG)

(72) Inventors: Jonathan Co Lee, Cary, NC (US); Daniel Pollack, Morrisville, NC (US); Jonathan Yu, Raleigh, NC (US); Jacek Spiewla, Morrisville, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 98 days.

(21) Appl. No.: 18/796,990

(22) Filed: Aug. 7, 2024

(65) Prior Publication Data

US 2026/0046564 A1 Feb. 12, 2026

(51) Int. Cl.
*H04R 5/033* (2006.01)
*H04R 3/12* (2006.01)
*H04S 3/00* (2006.01)

(52) U.S. Cl.
CPC ............... *H04R 5/033* (2013.01); *H04R 3/12* (2013.01); *H04S 3/008* (2013.01); *H04R 2499/15* (2013.01); *H04S 2400/01* (2013.01)

(58) Field of Classification Search
CPC ...... H04R 5/033; H04R 3/12; H04R 2499/15; H04S 3/008; H04S 2400/01
USPC ............................................................. 381/74
See application file for complete search history.

(56) References Cited

U.S. PATENT DOCUMENTS

| | | | | |
|---|---|---|---|---|
| 6,483,925 B1 * | 11/2002 | Shen | H04R 5/033 | 381/370 |
| 8,000,486 B2 * | 8/2011 | Hildebrandt | H04R 1/1075 | 381/74 |
| 12,212,914 B2 * | 1/2025 | Chng | H04R 1/1058 | |
| 2009/0226024 A1 * | 9/2009 | Dean | H04R 1/1016 | 381/379 |
| 2024/0305951 A1 * | 9/2024 | Francl | G02B 27/0093 | |
| 2025/0008287 A1 * | 1/2025 | Li | H04S 7/304 | |
| 2025/0317683 A1 * | 10/2025 | Staerke | H04R 1/1041 | |

* cited by examiner

*Primary Examiner* — David L Ton
(74) *Attorney, Agent, or Firm* — Carroll, Hoette & Butscher, LLC; Josef L. Hoffmann

(57) ABSTRACT

A headset is provided that includes a body configured to secure to a head or neck of a user, and plural movable speakers movably coupled within the body. The headset also can include a memory to store executable instructions and one or more processors. When implementing the executable instructions, the one or more processors can be configured to obtain sound data related to plural sounds, determine a headset location for each sound of the plural sounds, and actuate the headset to move at least one movable speaker of the plural movable speakers to a corresponding headset location based on the sound data.

20 Claims, 3 Drawing Sheets

SYSTEM AND METHOD FOR PROVIDING SOUND IN A HEADSET

BACKGROUND

Embodiments herein generally relate to devices and methods for controlling sound in a headset.

Electronic devices, such as gaming consoles, laptop computers, mobile phones, personal digital assistants (PDAs), iPads, other computing devices, etc. have become part of many individuals' everyday life. Such electronic devices continue to be improved to make the experience of the user as enjoyable as possible.

Often electronic devices include headsets for listening to sound related to the electronic device. For example, when individuals use their electronic devices in public, often headsets are used so that others in the public do not need to hear the sound being produced by the electronic device. Even when not in public individuals utilize headsets when gaming or using other electronic devices for an immersive experience associated with a game or activity related to the electronic device. In some examples augmented reality (AR) systems are provided that provide a user with a fully immersive experience during use.

With such immersive headsets becoming more prevalent, spatial audio is in demand. Current solutions do not adequately and accurately provide a full audio experience for users, especially in terms of direction and position. Physical speakers are limited to fixed positions on a device and tuning helps with spatial awareness. Still, providing directional sound often lessens the overall sound experience resulting in low sound quality.

In many extended/augmented reality headsets, there are a limited number of speakers and they are usually on the sides of the device. In more advanced headsets, there are more speakers, but they are typically limited to planes. In other words, each speaker is limited to a fixed position on the headset, resulting in fixed areas in which sound can be directed. Tuning and software technology is thus needed to fill in the gap for spatial audio.

Thus, a need exists for improved sound experience associated with headsets.

SUMMARY

In accordance with embodiments herein, a headset is provided that includes a body configured to secure to a head or neck of a user, and plural movable speakers movably coupled within the body. The headset also can include a memory to store executable instructions and one or more processors. When implementing the executable instructions, the one or more processors can be configured to obtain sound data related to plural sounds, determine a headset location for each sound of the plural sounds, and actuate the headset to move at least one movable speaker of the plural movable speakers to a corresponding headset location based on the sound data.

Optionally, the body can include a track that receives each of the plural movable speakers therein. In one aspect, the headset can further include a sound band that receives the plural movable speakers and is received within the track. In another aspect, the body may include plural magnet portions disposed about the body and to actuate the headset includes actuating at least one magnet portion of the plural magnet portions adjacent the corresponding headset location. In one example the one or more processors may be further configured to couple to an electronic device and obtain the sound data from the electronic device. In yet another example, the electronic device can be one of an augmented reality (AR) device or a gaming device. Optionally, the at least one movable speaker can face outwardly away from the headset. In one aspect, the headset may be a helmet, headband, pair of goggles, pair of glasses, neckband, neck attachment, or wearable device.

In accordance with embodiments herein, an audio/video (A/V) system is provided that can include an electronic device configured to display content that includes sound data and a headset coupled to the electronic device. The headset can include a body configured to secure to a head or neck of a user and plural movable speakers movably coupled within the body. The headset can also include a memory to store executable instructions and one or more processors. When implementing the executable instructions, the one or more processors can be configured to obtain the sound data from the electronic device, determine a headset location for each sound related to the sound data, and actuate the headset to move at least one movable speaker of the plural movable speakers to a corresponding headset location based on the sound data.

Optionally, the electronic device can be a gaming device. In one aspect, the gaming device can include a separate display that couples to the gaming device that is configured to display the content. In another aspect, the body may include a track that receives each of the plural movable speakers therein. In one example the headset can also include a sound band that receives the plural movable speakers and is received within the track. In another example, the body can include plural magnet portions disposed about the body and to actuate the headset includes actuating at least one magnet portion of the plural magnet portions adjacent the corresponding headset location. In yet another example, the at least one movable speaker can face outwardly away from the headset.

In accordance with embodiments herein a computer implemented method for providing sound to a user of a headset is provided. The method includes under control of one or more processors including program instructions to obtain sound data related to plural sounds. The one or more processors can also be configured to determine a headset location for each sound of the plural sounds and actuate the headset to move at least one movable speaker of plural movable speakers to a corresponding headset location based on the sound data.

Optionally, to move the movable speaker of the plural movable speakers can include moving the plural movable speakers within a track in a body of the headset. In one aspect, to actuate the headset to move the at least one movable speaker may include actuating a magnet section to move the at least one movable speaker towards the headset location determined. In another aspect, the method can also include selecting the at least one movable speaker to produce a determined sound and actuating the at least one movable speaker to produce the determined sound after the at least one movable speaker moves to the corresponding headset location. In one example, the method may also include actuating a magnet section to move the at least one speaker away from the corresponding headset location after the determined sound has been made.

DETAILED DESCRIPTION

Figure 1:
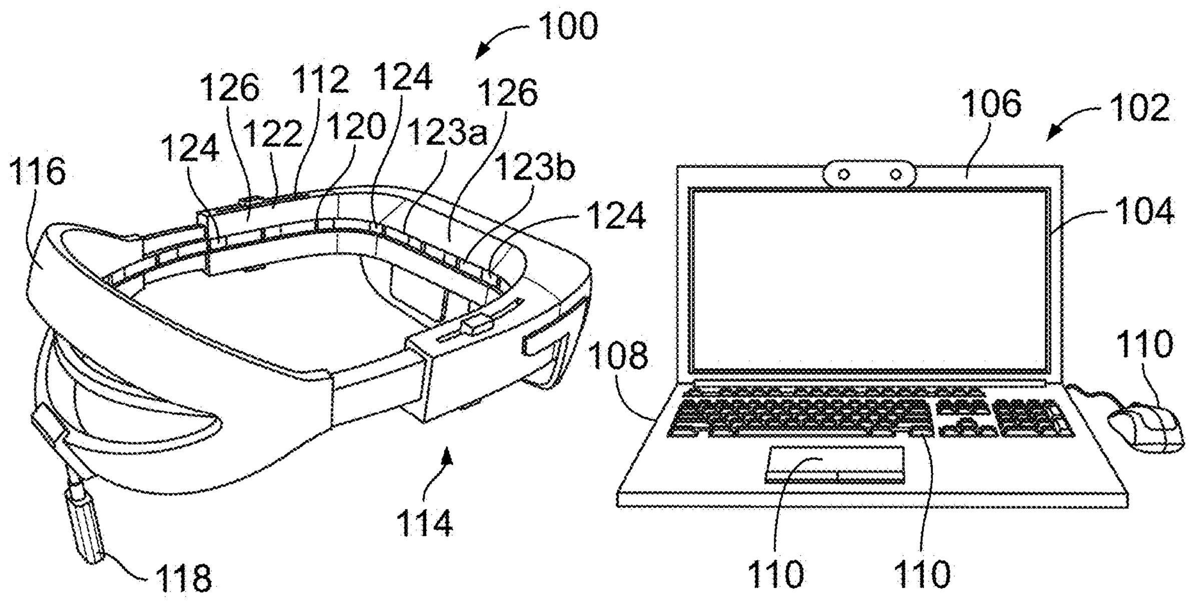
FIG. 1 illustrates a perspective view of a headset and electronic device, in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "headset" as used herein shall mean any and all devices, systems, assemblies, etc. that include movable speaks that can couple to an individual to provide the movable speaker in a location proximate to at least one ear of the user/wearer. The headset can be coupled to the head of a user, ear of the user, neck of the user, shoulders of a user, back of a user, or the like. In example embodiments the headset may be wearable, a hat, a helmet, a headband, an earpiece, goggles, glasses, a visor, a neckband, jewelry, a back brace or the like. In particular, the headset refers to items that can be associated with a head of a user and more particularly, the ears of a user.

The term "sound band" as used herein shall mean a flat strip or loop of material can be put around a body part of a user and includes speakers that are configured to emit sound. The body part may be the head, neck, etc. of the user. In one example the sound band may be made of an elastic material, rubber, plastic, or the like. The sound band may include movable speakers that can move about the sound band. In one example the sound band may snuggly fit within a track of a headset.

The terms "micro-electromechanical system speaker" or "MEMS speaker" as used interchangeably herein shall mean a type of speaker that can be part of a larger MEMS system that includes MEMS speaker arrays, electromechanical actuators, user interfaces, including input buttons and other actuating devices, processors, transceivers, memories, etc. MEMS speaker arrays allow operation of each individual MEMS speaker, while also allowing each of the MEMS speakers to operate together via a mesh network to provide desired sounds in desired locations.

The phrase "real-time" as used herein shall mean at the same time, or a time substantially contemporaneous, with an occurrence of another event or action. For the avoidance of doubt, as an example, a dynamically adjusted object or device is changed immediately, or within a second or two.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real-time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A headset is provided that includes an array of speakers that in one example are provided on a flexible sound band. The speakers are linked to an auditory mesh ecosystem that are embedded on a plane, either surface or material such as fabrics and hardgoods, such as MEMS speakers that can form a MEMS speaker array. The auditory mesh ecosystem provides these numerous movable speakers that can operate together to provide sound quality that can mimic real world environments. To this end, all of the movable speakers are interconnected to provide a user with this sound experience.

The array of speakers are distributed around the user based on a hardware design. This can be 360 degrees around the user, embedded in head or neck bands, hats, or fully enclosed in a helmet. The array of speakers are tuned to provide auditory feedback based on position in space. If a sound is required to be placed at a specific location in a 3-dimensional environment, the speaker closest to the position reacts and provides audio feedback. The array of speakers can physically move across the plane, surface, or fabric. The array of speakers can exist on a movable plane that circumnavigates the user or are on a track that can move around the user. The array of speakers can be positioned on various surfaces of a headset that allow each speaker to move semi-freely in space. In one example the speakers are coupled in tracks and can move in various track positions based on track shape (circular, cross, etc.).

As a result of each speakers being on a fully immersive headset, each speaker can be inwardly or outwardly facing without distorting or blocking the vision of the user. In one example the headset can be used as a form of navigation in the real world. In particular, by using echolocation when the speakers are facing outwardly or enhanced directional hearing using speaker arrays that move to different locations, the speakers can be utilized to sense the environment (e.g., enhanced directional listening, ANC, selective filtering). In another example the array of speakers can also emulate different contexts and scenarios by emulating haptics when embedded as a mesh in fabric, headband, or the like. For example, the speakers can simulate the feeling of raindrops on your head, the wind blowing on top of your head using a combination of audible and non-audible frequencies and patterns. In another embodiment the speakers can be embedded on an elastic material (e.g., stretchable fabric band) such that the speaker array can react to the amount of stretch in real-time and adjust various audio parameters (e.g., volume, phase, frequency response) to provide improved sound localization, directional steering, and loudness. In another example the speaker array can be embedded on a user-bendable or deformable material (e.g., shape memory alloy), affording the user the ability to manipulate the array's shape and its acoustic directionality to their liking. In particular, drivers in the speaker array can be touch sensitive, allowing users to control muting, transport functions, left/right balance control and equalization change by tapping driver(s) in specific ways. In yet another application speakers can be placed on an electromagnetic surface where speakers are attached via magnets. The charged surface can be altered, moving the speakers from one position to another. Consequently, seamless and dynamic audio positioning occurs.

FIG. 1 illustrates a headset 100 that provides enhanced sound. While referred to as a headset, the headset 100 can be any device that can be worn or fitted to a user adjacent to the ears of the user. In this manner the headset can be a helmet, headband, pair of goggles, pair of glasses, neckband, neck attachment, wearable device, or the like. In the example embodiment of FIG. 1 the headset 100 fully encompasses the head of the user. In particular, because the speakers of the headset move, in one embodiment the headset extends around the entire head, or neck of a user. Still, in other example embodiments the headset only partially is secured around the head or neck of the user.

The headset 100 in one example is a standalone device. For example, the headset 100 may simply function as headphones and provide music and be completely self-contained. In another example the headset may be an AR headset, providing functionality without coupling to another device.

In other example embodiments, the headset 100 may be operably coupled to an electronic device 102. In such an embodiment the electronic device 102 may be an augmented reality device, mobile device, such as a cellular telephone, smartphone, tablet computer, personal digital assistant, laptop/desktop computer, gaming device, a media streaming hub device, IoT device, or the like. The electronic device 102 may communicate with the headset 100 such that the headset 100 provides the sound for the electronic device. As an example, the electronic device may include a display 104 of a display subassembly 106 on which content such as a video, movie, game, or the like is displayed that includes sound. The electronic device 102 may communicate the sound for the display to the headset 102 via a wired or wireless connection. Wireless connections can include Bluetooth, cellular connections, Wi-Fi, other communication protocols, or the like.

In one example the electronic device 102 may include an electronic terminal that includes a user interface and is configured to access a network over a wired or wireless connection. As non-limiting examples, the electronic device 102 may access the network through a wireless communications channel and/or through a network connection (e.g. the Internet). The electronic device 102 in one embodiment is in communication with a network resource via the network. The network resource can be a server, application, remote processor, the cloud, etc. The network may represent one or more of a local area network (LAN), a wide area network (WAN), an Intranet or other private network that may not be accessible by the general public, or a global network, such as the Internet or other publicly accessible network.

The electronic device 102 in one example includes a base subassembly 108 that is coupled to the display subassembly 106. The base subassembly 108 can be rotatably coupled to the display subassembly 106 such that the display subassembly 106 can be moved from a closed position to an open position. Alternatively the base subassembly 108 can be detachable from the display subassembly 106. In yet other examples, such as when the electronic device is a phone, just a display subassembly 106 can be provided.

The base subassembly 108 can include inputs 110. The inputs 110 can include keys that include letters, numbers, functions, a mouse, a mouse pad, or the like. In this manner the inputs 110 can be utilized to input information into the electronic device. Such information can include words typed into a document, website, email, text, or the like. In an alternative embodiment the inputs 110 may be part of the display subassembly 108.

The headset 100 includes a body 112 that at least partially encompasses the head or neck of a user. In the example of FIG. 1 the body 112 is configured to fully encompass the head of a user. Such fully encompassed body 112 is considered to encompass 360° even though the size and shape of different individual's heads may differ in size and shape. In one example the body 112 can be made from a flexible material such as rubber, nylon, plastic, mesh metals, or the like. In example embodiments the flexible material form fits around the head or neck of a user providing a biasing force inwardly towards the head or neck. Still, the biasing force is not so great to constrict the head or neck. To this end, the body 112 can adjust in size, circumference, elastically stretch or the like to snuggly and comfortably fit around the head or neck of the user. In one example the body may include an adjustment mechanism 114 that can elongate or reduce the size of the body 112. To this end, in example embodiments the body 112 can be formed in multiple pieces or sections that overlap with one another such that one section can slide along another section to increase the overall circumference of the body 112. The adjustment mechanism can be a belt like mechanism that includes a tongue that can be inserted into different corresponding openings between two different sections to provide the adjustment. Alternatively, multiple wedges and bars can be used, the elasticity of the body itself allowing deformation, overlapping sections with buckles, or the like can be used to adjust the body 112 to the head or neck of the user.

The body 112 may also include a support structure 116 that can engage a greater area of the head or neck for additional support. Depending on the headset 100, such as augmented reality device embodiments, the headset may include optical components such as lenses, goggles, glasses, or the like. In addition, the body 112 can include at least one input port 118. The input port can provide a location to receive communication cords, power cords, or the like.

In one embodiment the body 112 includes a track 120 that extends around an inner surface 122 of the body 112. The track 120 is configured to receive a plurality of movable speakers 124 therein. The track 120 may include a lip 123*a* at a surface to receive a sound band 123*b* that may include the movable speakers 124.

In one example the movable speakers 124 are MEMS speakers formed to receive communication from one or more processors of the headset 100 and/or electronic device 102 to provide sound and to move to determined locations. In yet another example the movable speakers 124 may be component within a MEMS system that is formed to receive communication from the one or more processors of the headset 100 and/or electronic device 102. In yet another example embodiment the movable speakers 124 can face outwardly away from the headset 100. In this manner the movable speakers can function as loudspeakers for the headset. To this end, the movable speakers 124 can rotate or move such that each moveable speaker can move from a first position facing inwardly towards the head of a user to a second position facing outwardly away from the head of the user.

The moveable speakers 124, when within the track 120, may include bearing surfaces to allow near zero friction movement of the speakers. In one example the body 112 can include numerous magnet portions 126 selectively positioned around and adjacent to the track. The magnet portions 126 can be selectively actuated such as for example via low levels of electric current so that the movable speakers 124 that are made of a magnetically attractive material selectively attract to an adjacent magnet section 126 when the magnet section 126 is actuated. In this manner, when a sound is to be provided at a certain location around the ear of the user, the magnet section 126 at that location can be actuated attracting the nearby movable speakers 124 to the magnet section 126 and to the desired location. Once the sound no longer needs to be heard from that selected location the magnet section 126 is no longer actuated so that any attracted moveable speakers 124 are able to move to a different magnet portion location as needed. In another example the current causing the attractive magnetism can be reversed when the movable speaker is no longer desired to be in a location to move the movable speaker back to an original location, or towards a new sound location. While in this example a combination of magnetic forces and bearings are utilized to move the movable speakers 124 to a desired sound location, in other example embodiments other mechanical, electrical, pneumatic, etc. devices can be used to move the movable speakers to a sound location.

In one example the movable speakers 124 can provide a combination of audible and/or non-audible frequencies, patterns, vibrations, haptics, etc. to further enhance the immersive experience of the headset. For example, the headset 100 may be formed of a fabric such that the movable speakers 124 can be embedded as a mesh in the fabric. In such examples, the speakers can simulate the feeling of raindrops on your head, the wind blowing on top of your head, or the like by using a combination of audible and non-audible frequencies and patterns. In another embodiment the speakers can be embedded on an elastic material (e.g., stretchable fabric band) such that the speaker array can react to the amount of stretch in real-time and adjust various audio parameters (e.g., volume, phase, frequency response) to provide improved sound localization, directional steering, and loudness.

Figure 2:
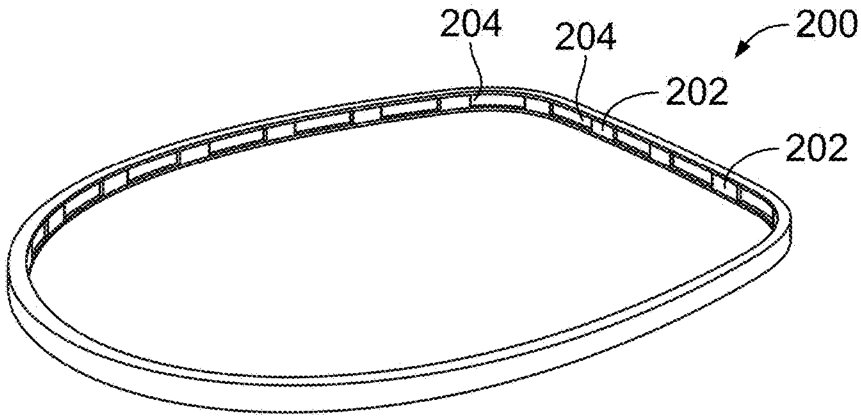
FIG. 2 illustrates a perspective view of a headset sound band, in accordance with embodiments herein.

FIG. 2 illustrates an example of a flexible sound band 200 that can be used as a headset, or alternatively can be placed within a track of a body of a headset. In one example the sound band 200 can be placed within the track of the headset illustrated in FIG. 1. The sound band 200, in example embodiments, can be made of a flexible material that allows the sound band 200 to stretch to the size of a headset. In this manner, if the headset is adjustable to a head or neck size of a user, the sound band can stretch to the desired size. The sound band 200 may be made from any elastic material including rubber, nylon, plastic, metal mesh, or the like.

The sound band 200 can be configured to receive a plurality of movable speakers 202. In one example the movable speakers 202 can be secured to the sound band via magnets, adhesive, hooks and loops, snap fit, or the like. In one example the sound band includes plural attachment members 204 that are removably received by the sound band while also being configured to removably receive each movable speaker 202. In this manner the number of moveable speakers positioned around the sound band 200 can be varied. In addition, by having attachment members 204 that are removable, if a moveable speaker 202 malfunctions or is desired to be replaces, the attachment member itself, or just the moveable speaker may be removed and replaced with a new movable speaker 202. In addition, a sound band 200 may start with a determined number of movable speakers 202 such as six, but if a user desires to enhance the sound additional speakers may be attached via the attachment member 204 onto the sound band 200 for additional movable speakers 202. In particular, as the number of movable speakers increases, the more enhances the sound quality becomes. To this end, in one example the sound band can be completely filled with movable speakers such that complete surround sound is provided by the sound band 200. In such an embodiment the movable speakers 202 would not move and instead the sound would just be provided at the desired location. Thus, if a user desires to use the maximum number of moveable speakers regardless of expense, such functionality is achieved. To this end, because the sound band is flexible and user head size differs, in one example 12 speakers may be sufficient to fully encompass the head or neck of one user while 13 speakers can be needed by a different user. Because of the detachable functionality, such different sizes can be accommodated.

The sound band 200 in one example is of size and shape to fit snuggly in a track of a headset. In one example the track may include a lip so that the sound band snaps into place within the body of the headset without easily becoming dislodged. In yet another embodiment, the movable speakers 202 are coupled to the sound band 200 and the sound band itself can be movable within the track. In this manner the movable speakers 202 can be stationary relative to the sound band 200 yet move relative to the headset as a result of movement of the band itself. By being a separate body from the headset, the sound band 200 may also be usable on different headsets that each have a track or way of receiving the sound band 200.

Figure 3:
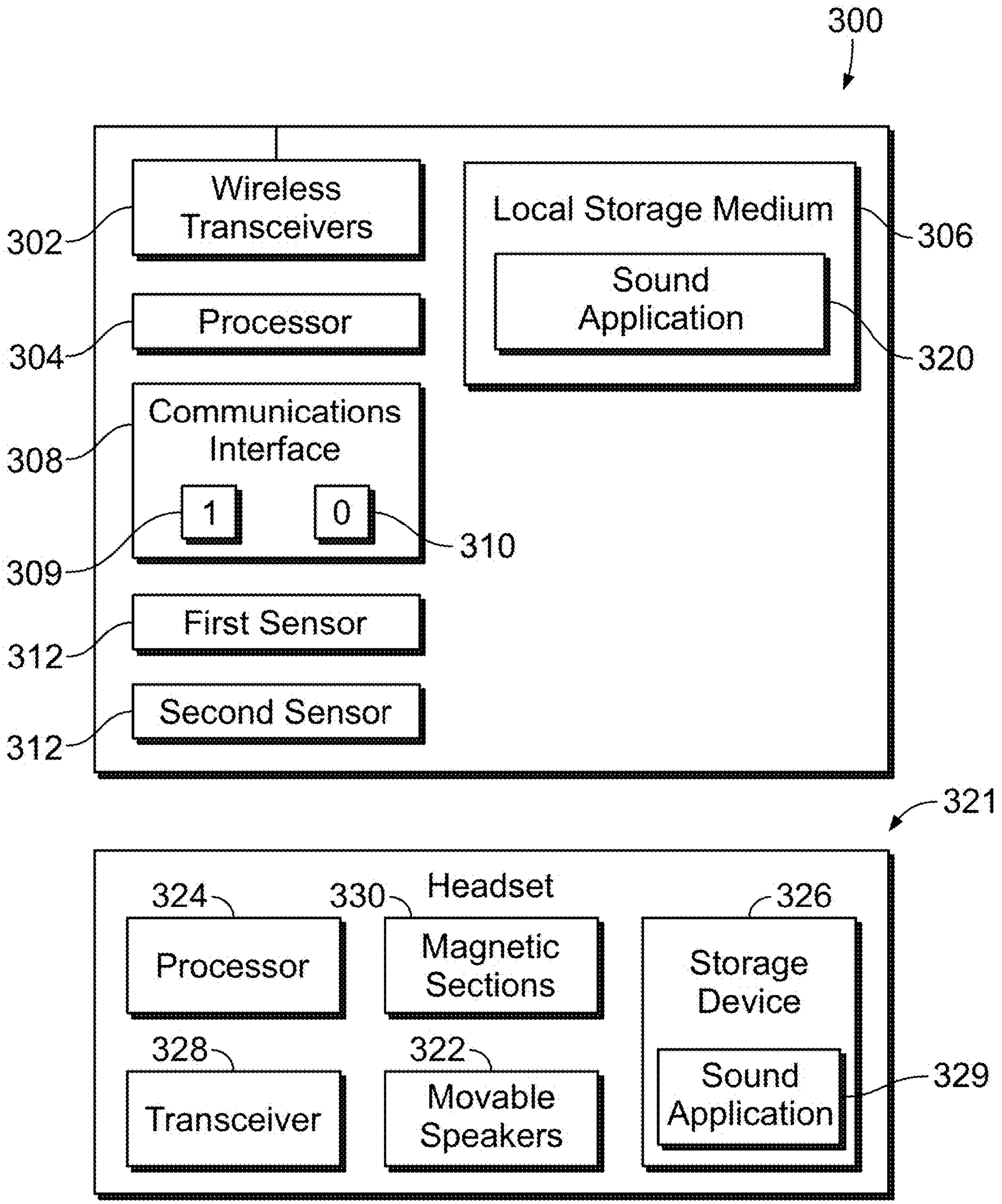
FIG. 3 illustrates a schematic block diagram of a headset and electronic device, in accordance with embodiments herein.

FIG. 3 illustrates a simplified block diagram of an electronic device 300. In one example the electronic device 300 can be the electronic device of FIG. 1 that communicates and is operably coupled to a headset. In another embodiment the electronic device 300 may be the headset of FIG. 1 that couples to a second electronic device as illustrated in FIG. 1. The electronic device 300 includes components such as one or more wireless transceivers 302, one or more processors 304 (e.g., a microprocessor, microcomputer, application-specific integrated circuit, etc.), and one or more local storage medium (also referred to as a memory portion) 306.

Each transceiver 302 can utilize a known wireless technology for communication. Exemplary operation of the wireless transceivers 302 in conjunction with other components of the electronic device 300 may take a variety of forms and may include, for example, operation in which, upon reception of wireless signals, the components of the electronic device communicate with another electronic device. The transceiver 302 demodulates the communication signals to recover incoming information, such as responses to inquiry requests, voice and/or data, transmitted by the wireless signals. The one or more processors 304 format outgoing information and convey the outgoing information to one or more of the wireless transceivers 302 for modulation to communication signals. The wireless transceiver(s) 302 convey the modulated signals to a remote device, such as a cell tower or a remote server (not shown).

The local storage medium 306 can encompass one or more memory devices of any of a variety of forms (e.g., read only memory, random access memory, static random access memory, dynamic random access memory, etc.) and can be used by the one or more processors 304 to store and retrieve data. The data that is stored by the local storage medium 306 can include, but need not be limited to, operating systems, applications, including a display application, obtained context data, informational data, or the like. Each operating system includes executable code that controls basic functions of the device, such as interaction among the various components, communication with external devices via the wireless transceivers 302, and storage and retrieval of applications and context data to and from the local storage medium 306.

The electronic device 300 in one embodiment also includes a communications interface 308 that is configured to communicate with a network resource. The communications interface 308 can include one or more input devices 309 and one or more output devices 310. The input and output devices 309, 310 may each include a variety of visual, audio, and/or mechanical devices. For example, the input devices 309 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 310 can include a visual output device such as a liquid crystal display screen, one or more status indicators that may be light elements such as light emitting diodes, an audio output device such as a speaker, alarm and/or buzzer, and a mechanical output device such as a vibrating mechanism. In one example an output device can be a display that presents content related to a video, movie, show, or the like. The display may be touch sensitive to various types of touch and gestures. As further examples, the output device(s) 310 may include a touch sensitive screen, a non-touch sensitive screen, a text-only display, a smart phone display, an audio output (e.g., a speaker or headphone jack), and/or any combination thereof.

The electronic device 300 can also include one or more sensors 312. The one or more sensors can include cameras, infrared cameras, microphones, light level sensors, power consumption sensors, or the like. The sensors 312 are configured to obtain data and information related to the user, environment, the electronic device 300, or the like. For example, when a sensor is a camera, the camera can identify that user of the electronic device 300. This information can be utilized to determine a profile of the user and settings desired by the user.

The electronic device 300 also includes a sound application 320 that configures the one or more processors of the electronic device 300 to operate a headset 321, including one or more movable speakers 322. In an example the movable speakers 322 can be MEMS speakers that are part of a MEMS speaker array system. In one example the movable speakers 322 each include one or more processors 324, a storage device 326 and a transceiver 328 for communicating with the transceiver 306 of the electronic device 300. In one example, the storage device 326 includes a sound application 329 that can include instructions for performing the methods and functions described herein. In particular, the electronic device 300 may have a sound application 320 and not the headset 321, the headset 321 can have a sound application 329 and not the electronic device 300, or both the electronic device 300 and the headset 321 may have sound applications 320, 329. When both the electronic device 300 and headset have sound applications, the sound applications 320, 329 may communicate with one another, share sound data, etc.

The movable speaker 322 additionally includes an output for producing sound. In one embodiment, the movable speaker can include a body or casing that is responsive to magnetic forces. For example, the movable speaker 322 can be made of a material or have a casing that is made of a material that is repelled to a magnetic force or attracted to a magnetic force such that a magnetic force can cause movement of the moveable speaker 322 within a track of the electronic device 300. To this end the headset 321 may include one or more magnetic portions or sections 330 that can be actuated, controlled, operated, etc. by a sound application 320 and/or 329. When actuated (such as when current is applied) an individual magnetic section 330 provides a magnetic force that either repels or attracts the movable speaker 322.

The sound application 320 and/or 329 is configured to provide instructions for functionality of the movable speakers 322. For example, the sound application may utilize context data obtained by one or more sensors 312, user inputs, or the like to determine the individual using the electronic device 300. Based on the user, the sound application 320/329 may include a profile of the user, including the desired sound quality provided by the movable speakers 322. For example, a first user may not desire to have any additional sound quality and just leave the movable speakers 322 adjacent to their ears during use, while second user of the same electronic device may desire enhanced sound quality where the movable speakers 322 move to locations around the head or neck of the user to provide a more immersive sound experience. So, for the second user the sound application 320/329 can automatically turn on the movable speaker feature, whereas for the second user, the movable speaker feature is not utilized.

The sound application 320/329 is also configured to receive sound information from the electronic device 300 or an auxiliary electronic device and determine the location of the sound produced by the movable speakers in relation to the head or neck of the user. In one example a user is playing a video game on an auxiliary electronic device that is coupled to the electronic device 300 (e.g., headset). In the video game if a zombie, another player, shooter, etc. is coming from behind the user in the game, the sound application 320/329 can determine that that sound should be made at the back of the user's head to simulate the idea the zombie, other player, shooter, etc. is coming up behind the player. Whereas if the same zombie, another player, shooter, etc. is coming from in front of the player, the sound application 320/329 can determine that the sound should be provided by the movable speakers in the front of the head or neck of the user. Such determinations can be made by communicating with the video game and using a lookup table, decision tree, mathematical model, or the like.

The sound application 320/329 is also configured to move the movable speakers 322 to the location around the electronic device determined. In one example, when a determination is made that the sound should come from behind the user, a magnetic portion or section 330 is actuated such that one or more movable speakers 322 move toward the location by either moving towards or away from the magnetic force. In other embodiments other mechanical, electrical, magnetic, pneumatic, etc. devices may be used to move the movable speakers 322 to the location where the sound is desired to be located. By moving the movable speakers 322 to the location the sound is coming from the game, a player knows where the zombie, other player, shooter is coming from instead of having to guess. As a result, the player can quickly locate the source of the sound improving their gaming experience.

In yet another example, the sound application 320/329 may communicate with an electronic device that is playing a movie or song where surround sound features are available. The sound application is configured to determine the location that sounds are intended to be provided for the surround sound and then move the movable speakers 322 to those locations. By having the speaker itself move to the location of the desired sound instead of attempting to direct a stationary speaker towards the location, sound quality is greatly enhanced.

Figure 4:
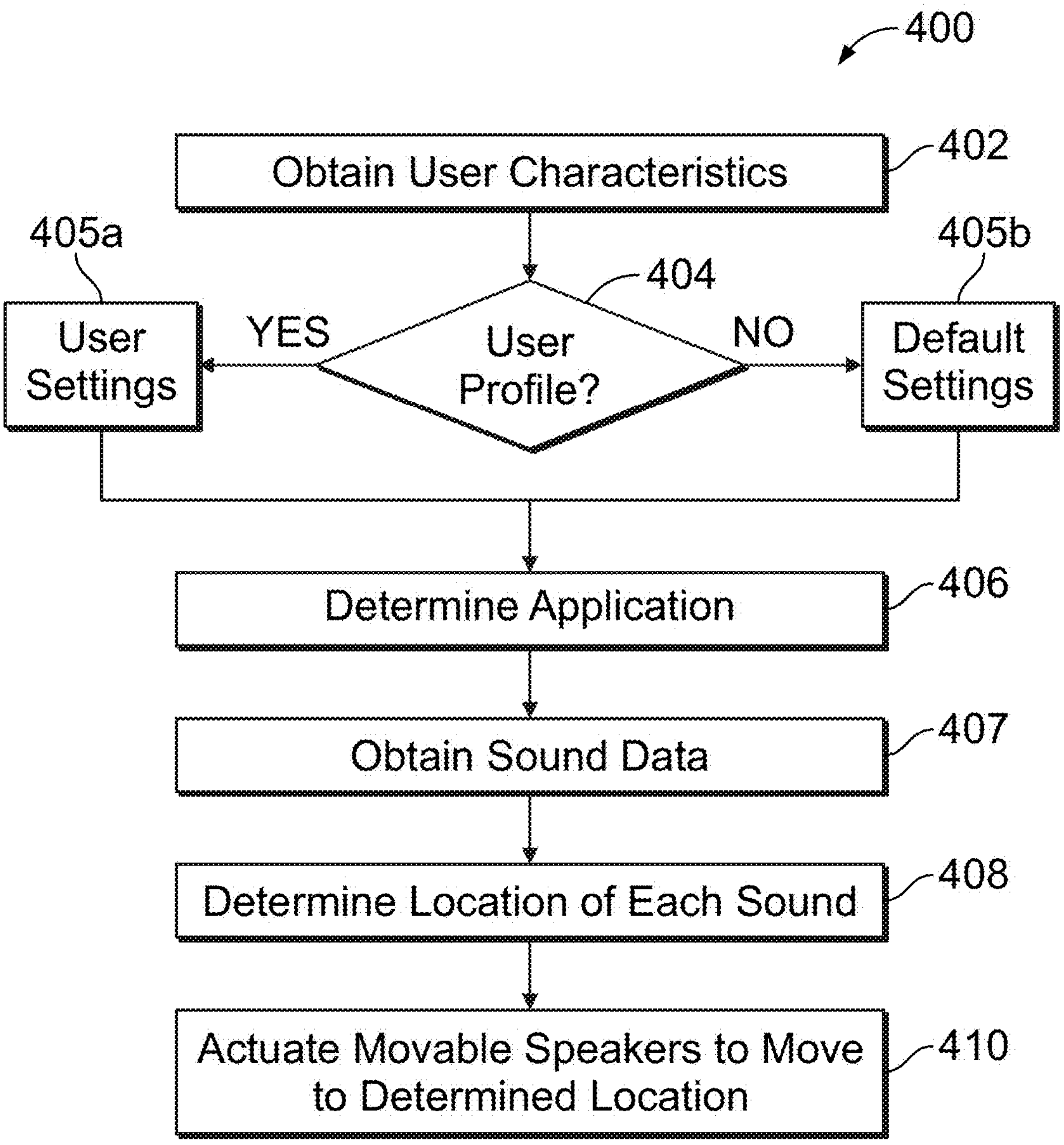
FIG. 4 illustrates a schematic block diagram of a process for providing sound with a headset, in accordance with embodiments herein.

FIG. 4 illustrates a block diagram of a method 400 of utilizing a sound application for a headset. The method 400, or at least one step of the method, may be implemented utilizing at least one component, headset, electronic device, etc. previously described in FIGS. 1-3.

At 402, one or more processors of a headset obtain user characteristics. In one example, the user characteristics are obtained via detecting an individual using the primary electronic device using a sensor such a camera, microphone, motion detector, or the like of the primary electronic device and communicating either the information or data detected, or identity of the user to the auxiliary electronic device. To this end, facial recognition, voice recognition, artificial intelligence (AI) modeling, etc. may be used to obtain the user characteristics. In addition, information input into the primary electronic device or auxiliary electronic device may be used to obtain the user characteristic, including the identity of the individual using the respective electronic device. Such input information includes login information, passwords, application logins and passwords, permission settings, fingerprint scanning, retinal scanning, user profile, user settings, or the like. User characteristics can include the age of a user, permission settings of a user, identification of a user, inputs of a user, or the like. In each instance, the user characteristic obtained provides information related to the identity of the individual using the electronic device.

At 404, the one or more processors determine if a user profile and/or settings are available for the individual using the electronic device and/or the sound application being used. In particular, based on both user characteristics obtained, and electronic device characteristics obtained, determinations are made regarding the identity of the individual using the electronic device along with applications being utilized by the electronic device. Such determinations may be made using a mathematical model, lookup table, decision tree, algorithm, mathematical function, or the like. The user settings can include the location of a desired sounds, types of applications (e.g., movie, music, video game, etc.) where the sound application is to be utilized, or the like. In this manner the user can customize the sound experience for themselves. So, if a user profile with user settings is provided then at 405*a* the one or more processors utilized user settings. Alternatively if the user has not provided their own settings, then at 405*b* the one or more processors utilize default settings.

Once settings are determined, at 406, the one or more processors of the headset communicates to determine the application being used by the user. In one example a music application may be utilized. In another example the user is playing a video game. In yet another example the application is a video or movie application.

At 407, the one or more processors obtain sound data related to sounds that are intended to be heard by a user of the headset, including based on content displayed by an electronic device. The sound data can be received from an electronic device, sound device, sound application, audio/video application, or the like. In one example the sound data is related to a song from a radio, recording, stream, sound application, etc. In another example the sound data is related to a video, video recording, AR display content, movie, or the like that a user of the headset is watching. For example, the headset may be coupled to an electronic device that is streaming a television show that is providing the sound data. Alternatively, sound data can be obtained from a video game that is being played on an electronic device. The content being displayed can include a movie, television show, streamed content, music video, game content, or the like.

At 408, the one or more processors determine the location for each sound obtained from the sound data. In particular, as described above, based on the whether a surround sound of a movie, sounds of video games, or music, the one or more processors determine the location of where the sound should be located on/in the headset. In one example a global navigation satellite made be utilized to determine the size of the circumference and position of the head of the user to determine the location of the sound. In another example a lookup table may be used that correlates surround sound data to various locations of the headset. In another example sound data of a video game that is meant to directionally provide sounds can be utilized with a mathematical function or model to determine the best location to position movable speakers.

At 410, the one or more processors based on the determined location actuates the movable speakers to move them to the determined location. In one example the movable speakers are actuated by actuating magnetic sections of the headset to attract or repel the movable speakers. In another embodiment pneumatic devices provide pneumatic pressure against the movable speakers to move them to the determined location. In another embodiment a gear with an electrical motor moves the movable speakers to the location.

In each example, the movable speakers are moved to the location determined, thus improving overall sound quality and experience for the user.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A headset, comprising:

a body configured to secure to a head or neck of a user;

plural movable speakers movably coupled within the body;

a memory to store executable instructions; and one or more processors, when implementing the executable instructions, are configured to:

obtain sound data related to plural sounds;

determine a headset location for each sound of the plural sounds; and actuate the headset to move at least one movable speaker of the plural movable speakers to a corresponding headset location based on the sound data.

2. The headset of claim 1, wherein the body includes a track that receives each of the plural movable speakers therein.

3. The headset of claim 2, the headset further comprising a sound band that receives the plural movable speakers and is received within the track.

4. The headset of claim 2, wherein the body includes plural magnet portions disposed about the body and to actuate the headset includes actuating at least one magnet portion of the plural magnet portions adjacent the corresponding headset location.

5. The headset of claim 1, wherein the one or more processors are further configured to:

couple to an electronic device; and obtain the sound data from the electronic device.

6. The headset of claim 5, wherein the electronic device is one of an augmented reality (AR) device or a gaming device.

7. The headset of claim 1, wherein the at least one movable speaker faces outwardly away from the headset.

8. The headset of claim 1, wherein the headset is a helmet, headband, pair of goggles, pair of glasses, neckband, neck attachment, or wearable device.

9. An audio/video (A/V) system comprising:

an electronic device configured to display content that includes sound data;

a headset coupled to the electronic device, the headset comprising;

a body configured to secure to a head or neck of a user;

plural movable speakers movably coupled within the body;

a memory to store executable instructions; and one or more processors, when implementing the executable instructions, are configured to:

obtain the sound data from the electronic device;

determine a headset location for each sound related to the sound data; and actuate the headset to move at least one movable speaker of the plural movable speakers to a corresponding headset location based on the sound data.

10. The (A/V) system of claim 9, wherein the electronic device is a gaming device.

11. The (A/V) system of claim 10, wherein the gaming device includes a separate display that couples to the gaming device that is configured to display the content.

12. The (A/V) system of claim 9, wherein the body includes a track that receives each of the plural movable speakers therein.

13. The (A/V) system of claim 12, the headset further comprising a sound band that receives the plural movable speakers and is received within the track.

14. The (A/V) system of claim 12, wherein the body includes plural magnet portions disposed about the body and to actuate the headset includes actuating at least one magnet portion of the plural magnet portions adjacent to the corresponding headset location.

15. The (A/V) system of claim 12, wherein the at least one movable speaker faces outwardly away from the headset.

16. A computer implemented method for providing sound to a user of a headset, comprising:

under control of one or more processors including program instructions to:

obtain sound data related to plural sounds;

determine a headset location for each sound of the plural sounds; and actuate the headset to move at least one movable speaker of plural movable speakers to a corresponding headset location based on the sound data.

17. The method of claim 16, wherein to move the movable speaker of the plural movable speakers includes moving the plural movable speakers within a track in a body of the headset.

18. The method of claim 16, wherein to actuate the headset to move the at least one movable speaker includes actuating a magnet section to move the at least one movable speaker towards the headset location determined.

19. The method of claim 16, further comprising:

selecting the at least one movable speaker to produce a determined sound; and actuating the at least one movable speaker to produce the determined sound after the at least one movable speaker moves to the corresponding headset location.

20. The method of claim 19, further comprising:

actuating a magnet section to move the at least one speaker away from the corresponding headset location after the determined sound has been made.

* * * * *